(12) United States Patent
Luo et al.

(10) Patent No.: US 12,242,405 B2
(45) Date of Patent: Mar. 4, 2025

(54) DATA CABLE AND CHARGING DEVICE

(71) Applicant: VIVO MOBILE COMMUNICATION CO., LTD., Dongguan (CN)

(72) Inventors: Fangding Luo, Dongguan (CN); Junchen Wei, Dongguan (CN); Yanbin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 265 days.

(21) Appl. No.: 18/096,523

(22) Filed: Jan. 12, 2023

(65) Prior Publication Data
US 2023/0140870 A1    May 11, 2023

Related U.S. Application Data

(63) Continuation of application No. PCT/CN2021/106213, filed on Jul. 14, 2021.

(30) Foreign Application Priority Data

Jul. 14, 2020   (CN) .......................... 202010674329.1

(51) Int. Cl.
*G06F 13/38* (2006.01)
*G05F 1/56* (2006.01)
(Continued)

(52) U.S. Cl.
CPC .............. *G06F 13/382* (2013.01); *G05F 1/56* (2013.01); *H01R 13/6691* (2013.01); *H01R 24/60* (2013.01); *H02J 7/00032* (2020.01)

(58) Field of Classification Search
CPC ........ G06F 13/382; H02J 7/0032; G05F 1/56; H01R 13/6691; H01R 24/60
See application file for complete search history.

(56) References Cited

U.S. PATENT DOCUMENTS 11,573,617 B2 *   2/2023   Sultenfuss .............. H02J 7/007
2013/0335010 A1 * 12/2013   Wu ........................ H02J 7/0071
                                                              320/107
(Continued)

FOREIGN PATENT DOCUMENTS

CN        108233130 A      6/2018
CN        110534988 A     12/2019
(Continued)

OTHER PUBLICATIONS

International Search Report issued in corresponding International Application No. PCT/CN2021/106213, mailed Sep. 28, 2021, 4 pages.

*Primary Examiner* — Henry Tsai
*Assistant Examiner* — Christopher A Daley
(74) *Attorney, Agent, or Firm* — IPX PLLC

(57) ABSTRACT

A data cable and a charging device are provided. The data cable includes a type-A interface and a type-C interface. The type-A interface and the type-C interface each includes a VBUS pin, a CC pin, a D+ pin, a D− pin, and a GND pin. A circuit identification module is disposed in the data cable, and the circuit identification module includes a switch circuit, a filtering circuit, a voltage regulator circuit, and a comparator circuit. The switch circuit is connected to a CC pin of the type-C interface, an output end of the voltage regulator circuit, a CC pin of the type-A interface, and an output end of the comparator circuit. Under the control of the comparator circuit, the switch circuit connects the CC pin of the type-C interface to the CC pin of the type-A interface or the output end of the voltage regulator circuit.

16 Claims, 4 Drawing Sheets

(51) Int. Cl.
    *H01R 13/66*     (2006.01)
    *H01R 24/60*     (2011.01)
    *H02J 7/00*     (2006.01)

(56) References Cited

U.S. PATENT DOCUMENTS

| | | | | |
|---|---|---|---|---|
| 2016/0064978 | A1* | 3/2016 | Lei | H02J 7/00 |
| | | | | 320/137 |
| 2017/0013095 | A1* | 1/2017 | Blankenship | H04W 74/0833 |
| 2019/0104586 | A1* | 4/2019 | Yu | H02J 7/0036 |
| 2019/0372376 | A1* | 12/2019 | Kwak | H01R 31/065 |
| 2023/0101461 | A1* | 3/2023 | Luo | H02J 7/00034 |
| | | | | 320/107 |

FOREIGN PATENT DOCUMENTS

| | | |
|---|---|---|
| CN | 111525349 A | 8/2020 |
| CN | 111697663 A | 9/2020 |
| CN | 111817386 A | 10/2020 |

\* cited by examiner

DATA CABLE AND CHARGING DEVICE

CROSS-REFERENCE TO RELATED APPLICATIONS

This application is a continuation of International Application No. PCT/CN2021/106213, filed on Jul. 14, 2021, which claims priority to Chinese Patent Application No. 202010674329.1 filed in China on Jul. 14, 2020. The entire contents of each of the above-referenced applications are expressly incorporated herein by reference.

TECHNICAL FIELD

This application pertains to the field of communication technologies, and specifically relates to a data cable and a charging device.

BACKGROUND

With the development of science and technology, quick charging is increasingly widely used.

In a related technology, a Power Delivery (PD) protocol is generally used for quick charging. A charger that supports charging of the PD protocol needs to use a Configuration Channel (CC) signal cable for communication. The charger that supports charging of the PD protocol generally uses a type-C interface and has a type-C to type-C data cable. A data cable that uses a type-A (or standard-A) interface performs communication by using a D+/D-signal cable, and cannot support charging in the PD protocol. Therefore, a type-A interface on the data cable does not support charging in the PD protocol.

SUMMARY

Embodiments of this application are to provide a data cable and a charging device.

This application is implemented as follows:

According to a first aspect, an embodiment of this application provides a data cable, including: a type-A interface and a type-C interface, where the type-A interface and the type-C interface are connected by using a cable, a VBUS pin, a D+ pin, a D− pin, and a GND pin of the type-A interface are connected to a VBUS pin, a D+ pin, a D− pin, and a GND pin of the type-C interface in one-to-one correspondence;

a circuit identification module is disposed in the data cable, and the circuit identification module includes a switch circuit, a filtering circuit, a voltage regulator circuit, and a comparator circuit; and the switch circuit is connected to the CC pin of the type-C interface, an output end of the voltage regulator circuit, and the CC pin of the type-A interface, a control end of the switch circuit is connected to an output end of the comparator circuit, an input end of the voltage regulator circuit is connected to a VBUS cable in the cable, an output end of the voltage regulator circuit is further connected to a first input end of the comparator circuit, a second input end of the comparator circuit is connected to an output end of the filtering circuit, and an input end of the filtering circuit is connected to the CC pin of the type-A interface; where under the control of the comparator circuit, the switch circuit connects the CC pin of the type-A interface to the CC pin of the type-C interface, or connects the output end of the voltage regulator circuit to the CC pin of the type-C interface.

According to a second aspect, an embodiment of this application provides a charging device, including a data cable and a charger. The data cable is the data cable in the first aspect, the charger includes a PD charging processing module, and when the charger is connected to the data cable, the PD charging processing module is connected to the CC pin in the type-A interface.

In the embodiments of this application, a CC pin is disposed in a type-A interface of a data cable, a CC communication signal transmitted on the CC pin of the type-A interface is filtered into a stable control signal by using a filtering circuit, and a comparator circuit is used to compare the analog signal with a stable voltage provided by a voltage regulator circuit, to output a corresponding control signal, so that when there is a signal on the CC pin of the type-A interface and when there is no signal on the CC pin of the type-A interface, control signals output by the comparator circuit are different control signals; an on/off state of a switch circuit is controlled according to the control signal, so that when the switch circuit connects an output end of the voltage regulator circuit to a CC pin of a type-C interface, the data cable can only perform non-PD protocol communication by using a D+ pin and a D− pin; and when the switch circuit connects the CC pin of the type-A interface to the CC pin of the type-C interface, the data cable can support non-PD protocol communication by using the D+ pin and the D− pin, and can also support PD protocol communication by using the CC pin. In this way, a data cable with the type-A interface can support charging in a PD protocol.

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

With reference to the accompanying drawings, a data cable and a charging device provided in the embodiments of this application are described in detail below by using a specific embodiment and an application scenario thereof.

Figure 1:
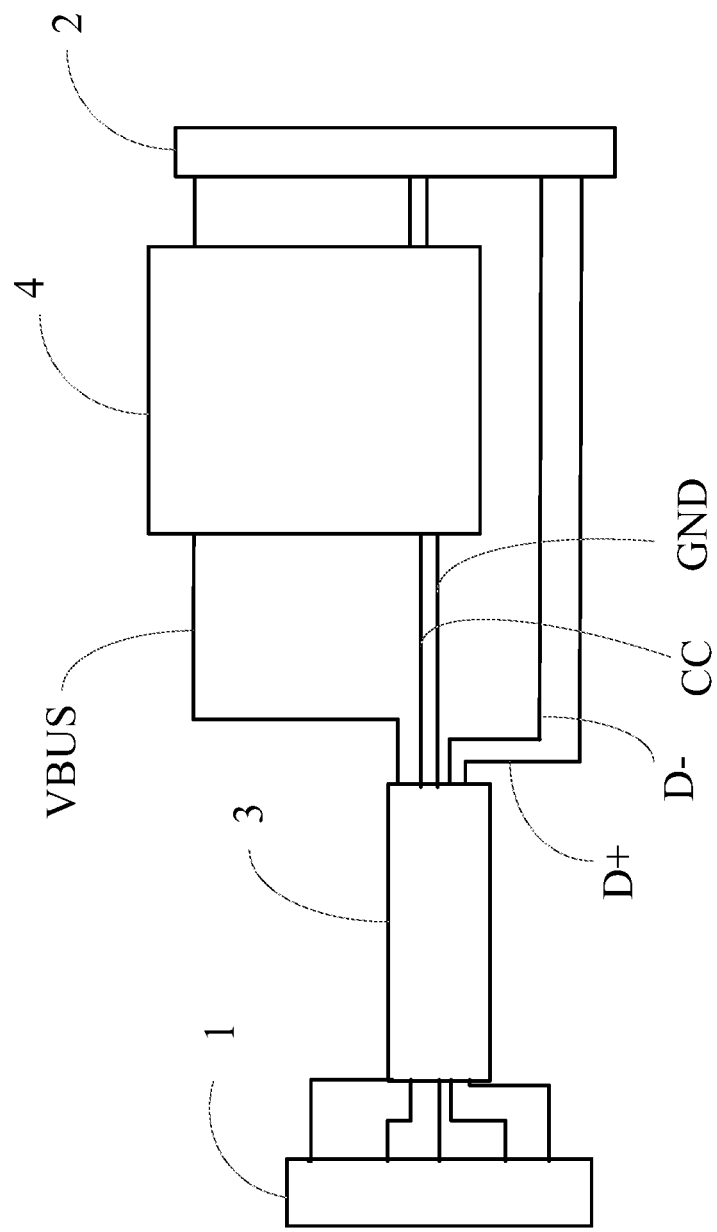
FIG. 1 a diagram of a structure of a data cable according to an embodiment of this application.
Figure 2:
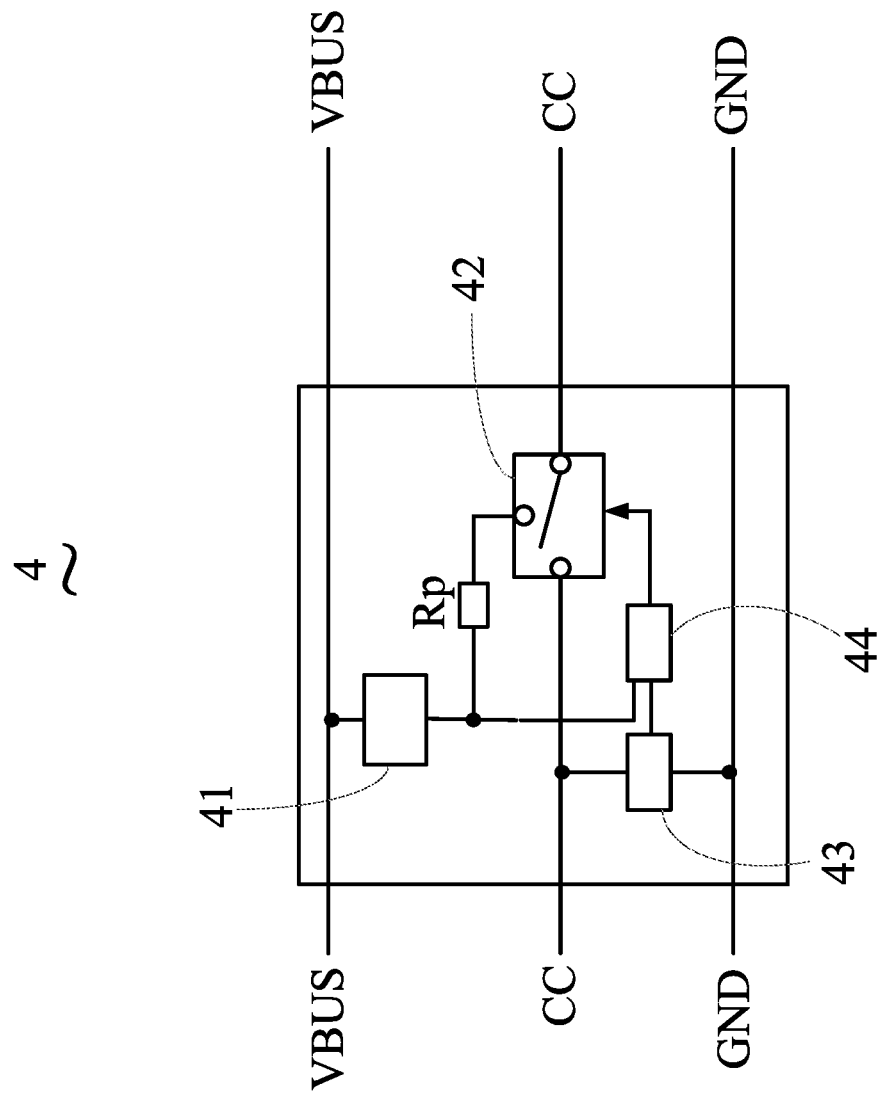
FIG. 2 is a diagram of a structure of a circuit identification module in a data cable according to an embodiment of this application.

Refer to both FIG. 1 and FIG. 2. FIG. 1 shows a structure of a data cable according to an embodiment of this application.

FIG. 2 is a diagram of a structure of a circuit identification module 4 in a data cable according to an embodiment of this application.

The data cable includes a type-A interface 1 and a type-C interface 2, where the type-A interface 1 and the type-C interface 2 are connected by using a cable 3, the type-A interface 1 and the type-C interface 2 each include a VBUS pin, a CC pin, a D+ pin, a D− pin, and a GND pin, and a VBUS pin, a D+ pin, a D− pin, and a GND pin of the type-A interface 1 are connected to a VBUS pin, a D+ pin, a D− pin, and a GND pin of the type-C interface 2 in one-to-one correspondence;

a circuit identification module 4 is disposed in the data cable, and the circuit identification module 4 includes a switch circuit 42, a filtering circuit 43, a voltage regulator circuit 41, and a comparator circuit 44; and a specific connection relationship of the switch circuit 42, the filtering circuit 43, the voltage regulator circuit 41, and the comparator circuit 44 is as follows: a first end of the switch circuit 42 is connected to the CC pin of the type-C interface 2, a second end of the switch circuit 42 is connected to an output end of the voltage regulator circuit 41, a third end of the switch circuit 42 is connected to the CC pin of the type-A interface 1, a control end of the switch circuit 42 is connected to an output end of the comparator circuit 44, an input end of the voltage regulator circuit 41 is connected to a VBUS cable in the cable 3, an output end of the voltage regulator circuit 41 is further connected to a first end of the comparator circuit 44, a second end of the comparator circuit 44 is connected to an output end of the filtering circuit 43, and an input end of the filtering circuit 43 is connected to the CC cable; and under the control of the comparator circuit 44, the first end of the switch circuit 42 is connected to the second end or the third end of the switch circuit 42.

In operation, the comparator circuit 44 determines, based on a numerical relationship between the first voltage value and the second voltage value, whether there is signal transmission on the CC pin of the type-A interface 1. The first voltage value is a voltage value of an electrical signal obtained from the first input end, and the second voltage value is a voltage value of an electrical signal obtained from the second input end.

In addition, when it is determined that there is signal transmission on the CC pin, the first end of the switch circuit 42 is controlled to be connected to the third end of the switch circuit 42 (that is, a CC cable is connected); when it is determined that there is no signal transmission on the CC pin, the first end of the switch circuit 42 is controlled to be connected to the second end of the switch circuit 42, that is, the CC cable is disconnected, and when the data cable is powered on, the CC pin of the type-C interface 2 obtains an electrical signal from the voltage regulator circuit 41 and the VBUS pin, so that a to-be-charged device can trigger non-PD charging when detecting the electrical signal by using the CC pin.

In some embodiments, that the first end of the switch circuit 42 is connected to the second end of the switch circuit 42 indicates that the switch circuit 42 connects the output end of the voltage regulator circuit 41 to the CC pin of the type-C interface 2. In this case, the CC pin of the type-C interface 1 is disconnected from the CC pin of the type-A interface 1.

In addition, that the first end of the switch circuit 42 is connected to the third end of the switch circuit 42 indicates that the switch circuit 42 connects the CC pin of the type-A interface 1 to the CC pin of the type-C interface 2. In this case, the output end of the voltage regulator circuit 41 is disconnected from the CC pin of the type-C interface 2.

In addition, the CC pin of the type-A interface 1 can be connected to the CC pin of the type-C interface 2 by using the CC cable.

In addition, that the VBUS pin, the D+ pin, the D− pin, and the GND pin in the type-A interface 1 are connected to the VBUS pin, the D+ pin, the D− pin, and the GND pin in the type-C interface 2 may be understood as follows: The VBUS pin in the type-A interface 1 is connected to the VBUS pin in the type-C interface 2 by using a VBUS cable, the GND pin in the type-A interface 1 is connected to the GND pin in the type-C interface 2 by using a GND cable, the D+ pin in the type-A interface 1 is connected to the D+ pin in the type-C interface 2 by using a D+ cable, and the D− pin in the type-A interface 1 is connected to the D− pin in the type-C interface 2 by using a D− cable.

In addition, the circuit identification module 4 disposed in the foregoing data cable may be disposed in the type-A interface 1, the type-C interface 2, or the cable 3 of the data cable. This is not specifically limited herein.

In some embodiments, PD charging may be understood as: transmitting a PD charging signal by using the CC cable, to perform PD charging negotiation with the to-be-charged device by using the PD charging signal, and charging the to-be-charged device according to a charging parameter determined in the PD charging negotiation.

In addition, the foregoing non-PD charging may be understood as: transmitting a communication signal by using the D+ pin and the D− pin, performing different charging negotiation with the charging device by using the communication signal, and charging the charging device according to a charging parameter determined in the charging negotiation.

In addition, in a conventional technology, an electrical signal on the VBUS cable fluctuates within a specific range. If the VBUS cable is directly connected to the comparator circuit 44, a magnitude relationship between an electrical signal on the CC pin of the type-A interface 1 and an electrical signal on the VBUS cable is compared. When the electrical signal on the VBUS cable fluctuates, the comparator circuit 44 may obtain an incorrect result.

In this implementation, the voltage regulator circuit 41 can obtain the electrical signal on the VBUS cable, and output an electrical signal with a constant voltage value, for example, an electrical signal with an output voltage value of 5 V (volt). In this way, a comparator compares an electrical signal output by the voltage regulator circuit 41 with an electrical signal output by the filtering circuit 43, to determine whether an electrical signal is transmitted on the CC cable, and when an electrical signal is transmitted on the CC cable, makes a CC communication channel conductive. However, when no electric signal is transmitted on the CC cable, the CC communication channel is disconnected, and the CC pin is pulled up to the VBUS cable, to trigger the to-be-charged device to perform non-PD charging.

For example, the voltage regulator circuit 41 is a Low Dropout Regulator (LDO).

The voltage regulator circuit 41 may be any voltage regulator that may adjust a fluctuating voltage to a stable voltage. This is not specifically limited herein.

In some embodiments, the filtering circuit 43 may be a shaping circuit. When a signal is transmitted on the CC cable, the filtering circuit 43 obtains a high-level signal from the CC cable, and correspondingly outputs a shaped high-level signal to the comparator circuit. When no signal is transmitted on the CC cable, the filtering circuit 43 releases an electrical signal, and outputs a shaped low-level signal to the comparator circuit when the released electrical signal is lower than a preset electrical signal.

In some embodiments, the electrical signal output by the voltage regulator circuit 41 may be between a low-level signal and a high-level signal, where the low-level signal is an electrical signal output by the filtering circuit 43 when no signal is transmitted on the CC cable, and the high-level signal is an electrical signal output by the filtering circuit 43 when a signal is transmitted on the CC cable.

In some embodiments, the switch circuit 42 includes two working states:

In a first working state, the first end of the switch circuit 42 is connected to the second end of the switch circuit 42, that is, the switch circuit 42 connects the CC pin of the type-C interface 2 to the VBUS cable by using the voltage regulator circuit 41, and the CC pin of the type-C interface 2 is disconnected from the second end of the CC cable. In this case, the CC communication channel is disconnected, and the CC pin of the type-C interface 2 is pulled up to the VBUS cable.

In this case, a structure of the data cable 2 is similar to a structure of a type-A to type-C data cable in the conventional technology, and a difference is that the CC pin of the type-C interface 2 in the type-A to type-C data cable in the conventional technology is connected to the VBUS cable by using a sixth resistor instead of the voltage regulator circuit 41.

In application, the data cable 2 in the foregoing working state has a same working principle as the type-A to type-C data cable in the conventional technology, that is, an electrical signal is transmitted to the to-be-charged device by using a CC pin connected to the VBUS cable, to instruct the to-be-charged device to perform non-PD charging.

In a second working state, the first end of the switch circuit 42 is connected to the third end of the switch circuit 42, that is, the switch circuit 42 connects the CC pin of the type-C interface 2 to the CC cable, and the CC pin of the type-C interface 2 is disconnected from the VBUS cable. In this case, the CC communication channel is connected.

In this case, the data cable 2 can perform PD charging negotiation with the to-be-charged device by using the CC cable and the CC pin that are connected.

In the conventional technology, a mobile terminal such as a mobile phone usually supports quick charging of a DP communication protocol and a DM communication protocol. In Data Minus (DM) charging communication and Data Positive (DP) charging communication protocols, a communication signal is transmitted by using the D+ pin and the D− pin. An electronic device such as a notebook usually supports quick charging of the PD communication protocol. In the PD communication protocol, a communication signal is transmitted by using the CC pin. In addition, in the conventional technology, data cables that support the PD communication protocol all use a data cable in a type-C to type-C form, and data cables that support the DP/DM communication protocol all use a data cable in a type-A to type-C form. In this way, the data cable that supports the PD communication protocol and the data cable that supports the DP/DM communication protocol cannot be exchanged.

However, the data cable in this implementation is a data cable that includes the type-A interface 1, and the CC pin is added to the type-A interface 1, and when a CC communication protocol signal is transmitted on the CC pin, the CC pin in the type-A interface 1 is connected to the CC pin in the type-A interface 2, so that PD quick charging can be performed on the to-be-charged device.

In addition, in actual application, in a case that the to-be-charged device supports only non-PD quick charging of the DP and DM communication protocols, DP and DM communication channels on the data cable are still in an on state, so that quick charging of the DP and DM protocols can be provided for the to-be-charged device.

In addition, during operation, in an initial state in which the data cable provided in this embodiment of this application is not connected to a power supply, the first end of the switch circuit 42 may be connected to the third end of the switch circuit 42, so that when the data cable is inserted into the to-be-charged device, PD charging communication is performed with the to-be-charged device by using the CC communication channel, and in a case that the CC communication signal is not obtained on the CC pin of the type-A interface within preset time after CC communication starts, the first end of the switch circuit 42 is switched to be connected to the second end of the switch circuit 42. The preset time may be 3 seconds, 5 seconds, or the like. This is not specifically limited herein.

In addition, a connection relationship between the VBUS pin, the D+ pin, the D− pin, and the GND pin in the type-A interface 1 and the type-C interface 2 and cables in the cable 3 is the same as a connection relationship between pins and cables in the conventional technology. For example, the connection relationship between pins on the type-C interface and the type-A interface 1 and the cable 3 is a connection relationship shown in the following Table 1:

TABLE 1

| Type-C interface | Cable | Type-A interface |
| --- | --- | --- |
| GND pin | GND cable | GND pin |
| VBUS pin | VBUS cable | VBUS pin |
| CC1 pin | CC1 cable | CC pin |
| CC2 pin | | |
| D+ pin | D+ cable | D+ pin |
| D− pin | D− cable | D− pin |

In implementation, in a case that the CC communication signal is received on the CC pin of the type-A interface 1, the CC communication signal is adjusted to a stable analog signal by using the filtering circuit 43, and the analog signal is compared with a stable voltage output by the voltage regulator circuit 41 by using the comparator circuit 44, so that when there is a signal on the CC pin of the type-A interface 1, the comparator circuit 44 outputs a first control signal, and when there is no signal on the CC pin of the type-A interface 1, the comparator circuit 44 outputs a second control signal. In this way, the output first control signal and the output second control signal are more accurate, and an on/off state of the switch circuit 42 can be controlled more accurately according to the first control signal and the second control signal.

In some embodiments, in a case that there is a signal on the CC pin of the type-A interface 1, the analog signal output by the filtering circuit may be a high-level signal. In this way, the comparator circuit 44 outputs the first control signal based on that the high-level signal is greater than the stable voltage output by the voltage regulator circuit 41, and the switch circuit 42 is connected to the first end and the third end of the switch circuit 42 in response to the first control signal. In a case that there is no signal on the CC pin of the type-A interface 1, the analog signal output by the filtering circuit 43 may be a low-level signal. In this way, the comparator circuit 44 outputs the second control signal based on that the low-level signal is less than the stable voltage output by the voltage regulator circuit 41, and the switch circuit 42 is connected to the first end and the second end of the switch circuit 42 in response to the second control signal.

In this implementation, the CC pin is disposed in the type-A interface 1, magnitude of the electrical signal output by the filtering circuit 43 and magnitude of the electrical signal output by the voltage regulator circuit 41 are compared by using the comparator circuit 44, and a corresponding control signal is output according to a comparison result, to control the CC pin to be connected or disconnected from the CC pin of the type-C interface 2, so that when there is a signal on the CC pin of the type-A interface 1, the CC pin is connected to the CC pin of the type-C interface 2, so that the PD communication channel in the data cable is connected, to support PD quick charging. When there is no signal on the CC pin of the type-A interface 1, the CC pin is controlled to be disconnected from the CC pin of the type-C interface 2, so that the PD communication channel in the data cable is disconnected. In this case, PD quick charging is not supported, and the CC pin is connected to the VBUS by using the voltage regulator circuit 41, to instruct the to-be-charged device to perform non-PD charging. In this way, in a case that the to-be-charged device connected to the data cable supports PD quick charging, the PD communications channel in the data cable can be connected, and PD quick charging is performed on the to-be-charged device. In a case that the to-be-charged device connected to the data cable does not support PD quick charging, the PD communication channel in the data cable is not connected, and a D+ cable is always connected to a D− cable, so that quick charging of DP/DM protocol communication is performed on the to-be-charged device.

In an implementation, the circuit identification module 4 further includes a sixth resistor Rp. The sixth resistor Rp is connected between the switch circuit 4 and the CC pin of the type-C interface 2, and the switch circuit 42 is configured to connect the CC pin of the type-C interface 2 to the output end of the voltage regulator circuit 41 by using the sixth resistor Rp, or is configured to connect the CC pin of the type-C interface 2 to the CC pin of the type-A interface 1.

In some embodiments, resistance of the sixth resistor Rp may be 56 KΩ (kilohm). When the CC pin of the type-C interface 2 is connected to the output end of the voltage regulator circuit 41 by using the sixth resistor Rp, the voltage regulator circuit 41 can collect power from the VBUS cable and output a stable voltage to the sixth resistor Rp. When the type-C interface 2 of the data cable is connected to a to-be-charged device that supports PD charging or is connected to a to-be-charged device that does not support PD charging, the CC pin of the type-C interface 2 has different electrical signal values. Therefore, the to-be-charged device can be instructed, based on an electrical signal transmitted on the CC pin of the type-C interface 2, to perform PD charging communication or non-PD charging communication, where the non-PD charging communication is to transmit a charging negotiation signal by using the D+ pin and the D− pin.

It should be noted that in some embodiments, the resistance of the sixth resistor Rp may further be changed according to a stable output voltage of the voltage regulator circuit, and the resistance of the sixth resistor Rp is not specifically limited herein.

In an implementation, the circuit identification module 4 is disposed in the cable 3, and a distance between the circuit identification module 4 and the type-A interface 1 is less than a distance between the circuit identification module 4 and the type-C interface 2.

In this implementation, the identification module 4 is disposed in the cable 3, to switch a corresponding connection relationship between the CC pin of the type-A interface 1 and the CC pin of the type-C interface 2 in the cable 3.

In addition, a distance between the circuit identification module 4 and one end of the type-A interface 1 is less than a distance between the circuit identification module 4 and one end of the type-C interface 2, and the circuit identification module 4 may be disposed near the type-A interface 1. In this way, a problem that a circuit board structure including the identification module 4 is disposed at a middle part of the cable 3 and affects fluency and beauty of the cable 3 can be prevented. In some embodiments, the circuit identification module 4 may be disposed near the type-C interface 2, and a problem that a circuit module of a relatively large diameter is disposed at a middle part of the cable 3 and affects fluency and beauty of the cable 3 can also be prevented.

It should be noted that, in some embodiments, the circuit identification module 4 may be disposed in the type-A interface 1 or the type-C interface 2, which does not affect a function of the circuit identification module 4. This is not specifically limited herein.

Figure 3:
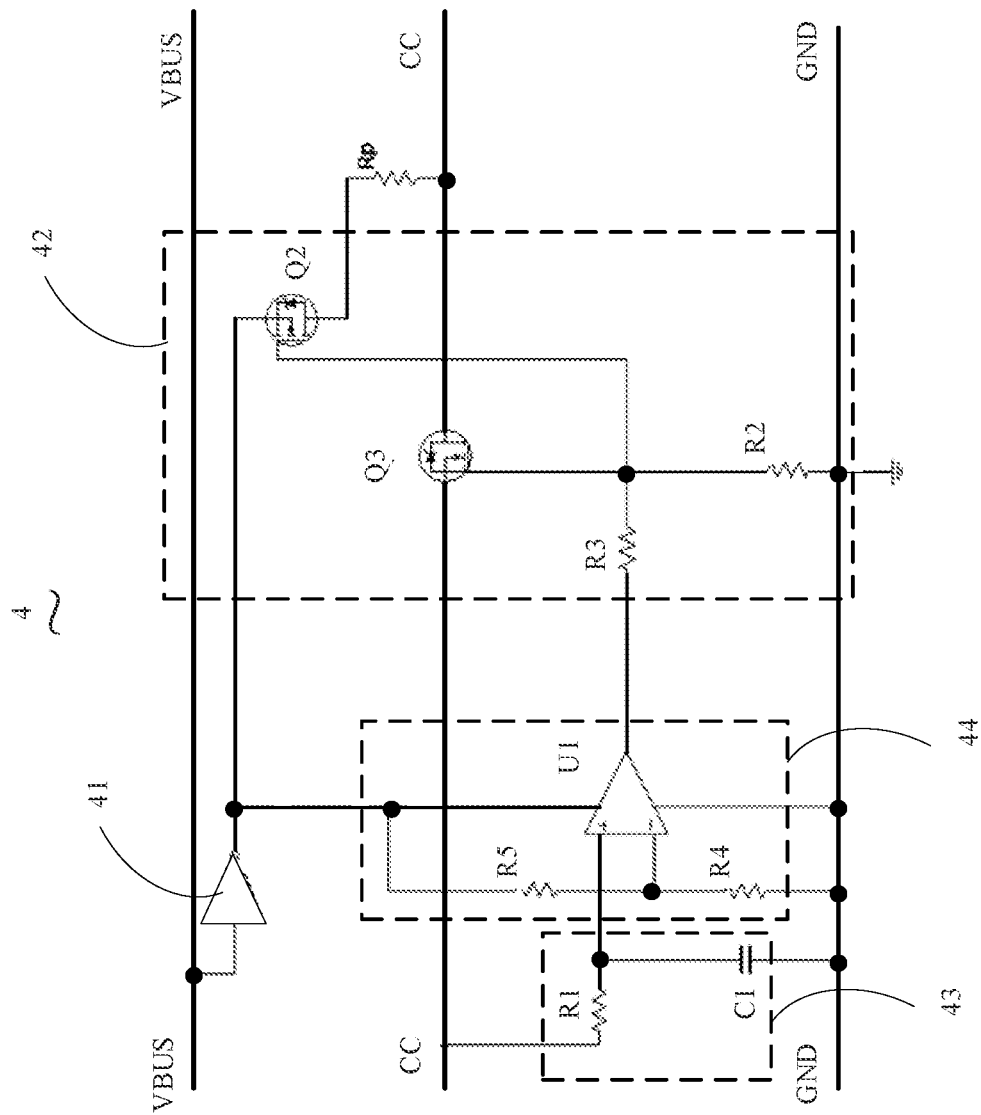
FIG. 3 is a circuit diagram of a circuit identification module in a data cable according to an embodiment of this application.

In an implementation, as shown in FIG. 3, the switch circuit 42 includes a first switching transistor Q3, a second switching transistor Q2, a first resistor R2, and a second resistor R3.

A connection relationship between the first switching transistor Q3, the second switching transistor Q2, the first resistor R2, and the second resistor R3 is as follows:

A first electrode of the first switching transistor Q3 and a first electrode of the second switching transistor Q2 are control ends of the switch circuit 42, the first electrode of the first switching transistor Q3 and the first electrode of the second switching transistor Q2 are further connected to the GND pin by using the first resistor R2 and are connected to the output end of the comparator circuit 44 by using the second resistor R3, a second electrode of the first switching transistor Q3 is connected to the CC pin of the type-A interface 1, and a third electrode of the first switching transistor Q3 is connected to the CC pin of the type-C interface; and a second electrode of the second switching transistor Q2 is connected to the output end of the voltage regulator circuit 41, and a third electrode of the second switching transistor Q2 is connected to the CC pin of the type-C interface 2; where in a case that there is no signal on the CC pin of the type-A interface 1, the first switching transistor Q3 is in an off state, and the second switching transistor Q2 is in an on state; and in a case that there is a signal on the CC pin of the type-A interface 1, the first switching transistor Q3 is in an on state, and the second switching transistor Q2 is in an off state.

In some embodiments, that the first switching transistor Q3 is in an on state indicates that the second electrode and the third electrode of the first switching transistor Q3 are conducted, and that the first switching transistor Q3 is in an off state indicates that the second electrode and the third electrode of the first switching transistor Q3 are disconnected.

Similarly, that the second switching transistor Q2 is in an on state indicates that the second electrode and the third electrode of the second switching transistor Q2 are conducted, and that the second switching transistor Q2 is in an off state indicates that the second electrode and the third electrode of the second switching transistor Q2 are disconnected.

That the first electrode of the first switching transistor Q3 and the first electrode of the second switching transistor Q2 are control ends of the switch circuit 42 indicates that the first electrode of the first switching transistor Q3 and the first electrode of the second switching transistor Q2 are separately connected to the output end of the comparator circuit 44.

In some embodiments, in a case that a signal is transmitted on the CC pin of the type-A interface 1, the filtering circuit 43 adjusts the signal on the CC pin of the type-A interface 1 to a high-level signal, and the comparator circuit outputs the first control signal according to that the high-level signal is greater than the output voltage of the voltage regulator circuit 41. The first control signal may be a level signal of a first value, and an electrical signal of the first value is transmitted to the first electrode of the first switching transistor Q3 and the first electrode of the second switching transistor Q2 after voltage division by the first resistor R2 and the second resistor R3. In this case, the first switching transistor Q3 is on, and the second switching transistor Q2 is off.

In addition, in a case that no signal is transmitted on the CC pin of the type-A interface 1, the filtering circuit 43 adjusts the signal on the CC pin of the type-A interface 1 to a low-level signal, and the comparator circuit outputs the second control signal according to that the low-level signal is less than the output voltage of the voltage regulator circuit 41. The second control signal may be a level signal of a second value, and an electrical signal of the second value is transmitted to the first electrode of the first switching transistor Q3 and the first electrode of the second switching transistor Q2 after voltage division by the first resistor R2 and the second resistor R3. In this case, the first switching transistor Q3 is off, and the second switching transistor Q2 is on.

The first value is different from the second value. In some embodiments, in a case that the first switching transistor Q3 is an N-type switching transistor and the second switching transistor Q2 is a P-type switching transistor, the first value is greater than the second value; and in a case that the first switching transistor Q3 is a P-type switching transistor and the second switching transistor Q2 is an N-type switching transistor, the first value is less than the second value.

In an implementation, the first switching transistor Q3 is an N-type Metal Oxide Semiconductor (NMOS) transistor, and the second switching transistor Q2 is a P-type Metal Oxide Semiconductor (PMOS) transistor.

In this case, the first value is greater than the second value.

In application, the first electrode of the first switching transistor Q3 may be a gate, the second electrode may be a drain, and the third electrode may be a source; and the first electrode of the second switching transistor Q2 may be a gate, the second electrode may be a drain, and the third electrode may be a source. In this way, when there is a signal on the CC pin of the type-A interface 1, the first electrode of the first switching transistor Q3 receives a high-level signal, to conduct the second electrode and the third electrode of the first switching transistor Q3. In this case, the first electrode of the second switching transistor Q2 receives a high-level signal, to disconnect the second electrode and the third electrode of the second switching transistor Q2.

Correspondingly, in a case that there is no signal on the CC pin of the type-A interface 1, the filtering circuit 43 does not output a high-level signal, that is, the filtering circuit 43 outputs a low-level signal, and the comparator circuit 44 outputs the second control signal according to the low-level signal. The second control signal may be a low-level signal. The first electrode of the first switching transistor Q3 receives the low-level signal, so that the first switching transistor Q3 is off, and the first electrode of the second switching transistor Q2 receives the low-level signal, so that the second switching transistor Q2 is on.

In some embodiments, the first switching transistor Q1 and the second switching transistor Q2 may be other types of transistors, and a connection circuit of each switching transistor in the switching circuit 42 is correspondingly changed, to connect or disconnect the CC pin of the type-A interface 1 and the CC pin of the type-A interface 2 according to a CC signal adjusted by the filtering circuit 43. This is not specifically limited herein.

The switch circuit 42 in this implementation is an analog signal control circuit. In this way, a control unit may be prevented from being disposed in the identification module 4, and an on/off state of the switch circuit 42 is controlled according to a digital control signal sent by the control unit, so that production costs of the switch circuit 42 can be reduced.

In an implementation, as shown in FIG. 2, the switch circuit 42 includes a switch, the first end of the switch circuit 42 is a fixed end of the switch, and both the second end and the third end of the switch circuit 42 are active ends of the switch.

In some embodiments, the switch may be switched according to a control signal transmitted by the filtering circuit 43. The control signal may be a digital control signal. In some embodiments, when there is a signal on the CC pin of the type-A interface 1, the comparator circuit 44 sends the first control signal to the switch, and the switch connects the fixed end to the third end in response to the first control signal, that is, connects the CC pin of the type-C interface 2 to the CC pin of the type-A interface 1. When there is no signal on the CC pin of the type-A interface 1, the comparator circuit 44 sends the second control signal to the switch, and the switch connects the fixed end to the second end in response to the second control signal, that is, connects the CC pin of the type-C interface 2 to the VBUS cable by using the sixth resistor Rp and the voltage regulator circuit 41.

In some embodiments, the control unit may be further disposed in the switch circuit 42. The control unit is separately connected to the comparator circuit 44 and the switch, to convert the analog signal output by the comparator circuit 44 into a digital control signal, so as to control the on/off state of the switch by using the digital control signal.

In this implementation, disposing the switch in the switch circuit can simplify a structure of the switch circuit. In an implementation, the filtering circuit 43 is an RC filtering circuit.

In application, when there is a signal on the CC pin of the type-A interface 1, the signal may be a fluctuating level signal, and the fluctuating level signal may be adjusted to a relatively stable level signal by using the RC filtering circuit, and is input to the comparator circuit 44, so that the comparator circuit 44 outputs a more accurate and stable control signal.

In this way, the control signal output by the comparator circuit 44 can be more stable and reliable.

Further, as shown in FIG. 3, the filtering circuit 43 includes a third resistor R1 and a capacitor C1.

A first end of the third resistor R1 is connected to the CC pin of the type-A interface 1, a second end of the third resistor R1 is connected to a first end of the capacitor C1, a second end of the capacitor C1 is connected to the GND pin of the type-C interface 2, and a first end of the capacitor C1 is further connected to the second input end of the comparator circuit 44.

In application, when there is no signal on the CC pin of the type-A interface 1, the filtering circuit 43 outputs a low-level signal (which may be a level signal whose value is 0). When there is a fluctuating level signal on the CC pin of the type-A interface 1, the capacitor C1 is charged when the level signal rises, and the capacitor C1 is discharged when the level signal decreases, so that the filtering circuit 43 outputs a steady high-level signal (a level signal whose value is greater than 0), and the high-level signal is input to the comparator circuit 44 for comparison with the electrical signal output by the voltage regulator circuit 41, so that the comparator circuit 44 outputs an accurate control signal to control the on/off state of the switch circuit 42.

In this implementation, the comparator circuit 44 may be used to compare a level signal output by the filtering circuit 43, and output an accurate control signal. Compared with a method in which the on/off state of the switch circuit 42 is directly controlled according to the level signal output by the filtering circuit 43, the level signal output by the filtering circuit 43 is a solution in which a level value fluctuates in a value range. In this implementation, a control signal with an accurate value that is output by the comparator circuit 44 controls the on/off state of the switch circuit 42, so that control sensitivity of the switch circuit 42 can be improved.

In some embodiments, capacitance of the capacitor C1 is greater than preset capacitance.

In some embodiments, the preset capacitance may be determined according to identification precision of the comparator circuit 44, a level value of the signal on the CC pin of the type-A interface 1, a change characteristic, and the like. This is not specifically limited herein.

In this implementation, the capacitance of the capacitor C1 is greater than the preset capacitance, so that when a level value of a signal transmitted on the CC pin of the type-A interface 1 fluctuates, the capacitor C1 is charged when a level of the transmission signal rises, and after charging, the capacitor C1 is discharged when the level value of the signal transmitted on the CC pin of the type-A interface 1 decreases. In this way, in a period in which a fluctuating electrical signal is transmitted on the CC pin of the type-A interface 1, a value of an electrical signal transmitted by the filtering circuit 43 to the comparator circuit 44 is relatively stable. When there is no transmission signal on the CC pin of the type-A interface 1, the capacitor C1 is depleted, so that no level value is output to the comparator circuit 44.

Therefore, when a low-level signal is transmitted on the CC pin of the type-A interface 1 and no transmission signal is transmitted on the CC pin of the type-A interface 1, a difference between analog signals output by the filtering circuit 43 further improves a difference between control signals output by the comparator circuit 44, and improves control accuracy of the switch circuit 42.

In an implementation, as shown in FIG. 3, the comparator circuit 44 includes a fourth resistor R4, a fifth resistor R5, and a comparator U1.

A first end of the comparator U1 is connected to the control end of the switch circuit 42, a second end of the comparator U1 is connected to the output end of the voltage regulator circuit 41, a third end of the comparator U1 is connected to the output end of the filtering circuit 43, a fourth end of the comparator U1 is connected to the GND pin, a fifth end of the comparator U1 is connected to a first end of the fourth resistor R4 and a first end of the fifth resistor R5, a second end of the fourth resistor R4 is connected to the GND pin, and a second end of the fifth resistor R5 is connected to the second end of the comparator U1.

The third end of the comparator U1 is the second input end of the comparator circuit 44, and the second end of the fifth resistor R5 and the second end of the comparator U1 are the same as the first input end of the comparator circuit 44.

In operation, in a case that there is a signal on the CC pin of the type-A interface 1, the output end of the filtering circuit 43 outputs a high-level signal, an electrical signal value on the third end of the comparator U1 is greater than an electrical signal value on the fifth end of the comparator U1, the comparator U1 outputs a first control signal, and the switch circuit 42 connects the first end to the third end of the switch circuit 42 in response to the first control signal; and in a case that there is no signal on the CC pin of the type-A interface 1, the output end of the filtering circuit 43 outputs a low-level signal, an electrical signal value on the third end of the comparator U1 is less than or equal to an electrical signal value on the fifth end of the comparator U1, the comparator U1 outputs a second control signal, and the switch circuit 42 connects the first end to the second end of the switch circuit 42 in response to the second control signal.

In some embodiments, the fourth resistor R4 and the fifth resistor R5 are configured to divide the electric signal output by the voltage regulator circuit 41, so that an electric signal value obtained by the fifth end of the comparator U1 from the voltage regulator circuit 41 meets the following conditions:

in a case that there is a signal on the CC pin of the type-A interface 1, the electrical signal value obtained by the fifth end of the comparator U1 from the voltage regulator circuit 41 is less than an electrical signal value (e.g., a voltage value) of the high-level signal output by the filtering circuit 43; and in a case that there is no signal on the CC pin of the type-A interface 1, the electrical signal value obtained by the fifth end of the comparator U1 from the voltage regulator circuit 41 is greater than an electrical signal value (e.g., a voltage value) of the low-level signal output by the filtering circuit 43.

In this implementation, the fourth resistor R4 and the fifth resistor R5 form a proportional circuit, to adjust a voltage value obtained by the fifth end of the comparator U1, so as to output control signals of different level values to the switch circuit 42 in a case that there is a signal or no signal on the CC pin of the type-A interface 1, thereby controlling the on/off state of the switch circuit 42.

Figure 4:
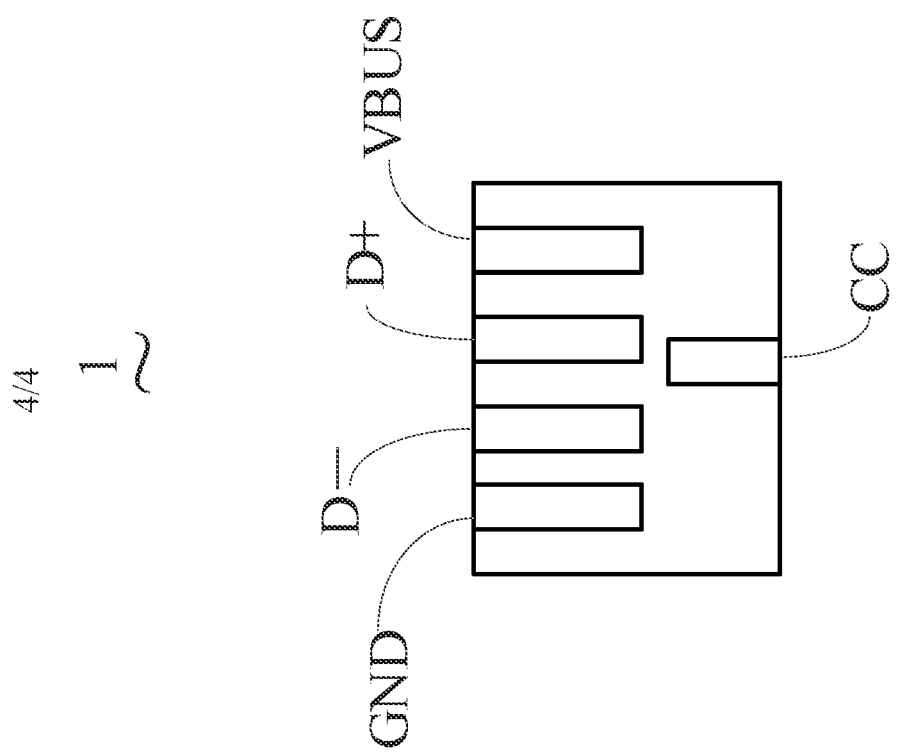
FIG. 4 is a diagram of a structure of a type-A interface in a data cable according to an embodiment of this application.

In an implementation, as shown in FIG. 4, the GND pin, the D+ pin, the D− pin, and the VBUS pin are disposed on a first side of the type-A interface 1, the CC pin is disposed on a second side of the type-A interface 1, and the first side and the second side of the type-A interface 1 are two opposite sides.

Distribution locations of pins in the type-A interface 1 may be further exchanged or changed. This is not specifically limited herein. In addition, structures and working principles of the VBUS pin and the GND pin are the same as those of a VBUS pin and a GND pin in a conventional technology, and are not specifically described herein.

In this implementation, the CC pin is disposed on the second side of the type-A interface 1, so that a structure and location distribution of the GND pin, the D+ pin, the D− pin, and the VBUS pin on the first side of the Type-A interface 1 are the same as those of a type-A interface in the conventional technology. In this way, the data cable provided in this embodiment of this application can be connected to a charger with a conventional type-A interface.

In a case that the data cable provided in this embodiment of this application is connected to a charger on which the conventional type-A interface is disposed, no CC pin is disposed in the conventional type-A interface, and therefore, the CC pin of the type A interface 1 cannot receive a CC signal. In this case, the charging device only supports quick charging of the DP/DM communication protocol.

An embodiment of this application further provides a charging device, and the charging device includes a charger and the data cable provided in the foregoing embodiments. The charger includes a PD charging processing module, and when the charger is connected to the data cable, the PD charging processing module is connected to the CC pin of the type-A interface.

In some embodiments, the charger includes a type-A female connector that matches the type-A interface in the data cable, and the type-A female connector includes a VBUS pin, a CC pin, a D+ pin, a D− pin, and a GND pin.

The type-A female connector that matches the type-A interface in the data cable may be understood as follows: In a case that the type-A interface in the data cable 2 is inserted into the type-A female connector in the charger 1, the type-A interface is connected to a same pin in the type-A female connector.

In addition, the charger may further include a D+/D− charging module (which may also be referred to as a non-PD charging processing module). A charging signal of the D+/D-charging module is transmitted by using a D+ pin and a D− pin. In some embodiments, the PD charging module is connected to the CC pin to perform communication of a PD protocol with a to-be-charged device by using the CC pin, to support PD quick charging. The D+/D− charging module is connected to the D+ pin and the D− pin to perform communication of a DP/DM protocol with the to-be-charged device by using the D+ pin and the D− pin, to support DP/DM quick charging.

It should be noted that, in this implementation, a specific working process of the foregoing charging device is corresponding to a working process of the data cable 2 in the foregoing embodiment, and details are not described herein again.

In addition, in a case that the pins in the type-A interface are in distributed positions shown in FIG. 4, the type-A female connector that matches the type-A interface may further be connected to a type-A interface on a conventional data cable, and in a case that the type-A female connector of the charger is connected to the type-A interface on the conventional data cable, only charging of the DP/DM protocol is supported.

The charging device provided in this embodiment of this application has the type-A interface, supports charging of the PD protocol and charging of the DP/DM protocol, and has a same effect as that of the data cable provided in this embodiment of this application. Details are not described herein again.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the electronic device in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A data cable, comprising: a type-A interface; and a type-C interface,
    wherein:
        the type-A interface and the type-C interface are connected by using a cable,
        the type-A interface and the type-C interface each comprises a VBUS pin, a CC pin, a D+ pin, a D− pin, and a GND pin, wherein the VBUS pin, the D+ pin, the D− pin, and the GND pin of the type-A interface are connected to the VBUS pin, the D+ pin, the D− pin, and the GND pin of the type-C interface in one-to-one correspondence, and
        a circuit identification module is disposed in the data cable, wherein the circuit identification module comprises a switch circuit, a filtering circuit, a voltage regulator circuit, and a comparator circuit, wherein
the switch circuit is connected to the CC pin of the type-C interface, an output end of the voltage regulator circuit, and the CC pin of the type-A interface,
a control end of the switch circuit is connected to an output end of the comparator circuit,
an input end of the voltage regulator circuit is connected to a VBUS cable in the cable,
an output end of the voltage regulator circuit is further connected to a first input end of the comparator circuit,
a second input end of the comparator circuit is connected to an output end of the filtering circuit, and
an input end of the filtering circuit is connected to the CC pin of the type-A interface, wherein
under the control of the comparator circuit, the switch circuit connects the CC pin of the type-A interface to the CC pin of the type-C interface, or connects the output end of the voltage regulator circuit to the CC pin of the type-C interface.

2. The data cable according to claim 1, wherein the voltage regulator circuit is a Low Dropout Regulator (LDO).

3. The data cable according to claim 2,
wherein:
the circuit identification module further comprises a sixth resistor,
the sixth resistor is connected between the switch circuit and the CC pin of the type-C interface, and
the switch circuit is configured to connect the CC pin of the type-C interface to the output end of the voltage regulator circuit by using the sixth resistor, to connect the CC pin of the type-C interface to the CC pin of the type-A interface.

4. The data cable according to claim 1,
wherein:
the circuit identification module is disposed in the cable, and
a distance between the circuit identification module and the type-A interface is less than a distance between the circuit identification module and the type-C interface.

5. The data cable according to claim 3, wherein the switch circuit comprises a first switching transistor, a second switching transistor, a first resistor, and a second resistor, wherein
a first electrode of the first switching transistor and a first electrode of the second switching transistor are control ends of the switch circuit,
the first electrode of the first switching transistor and the first electrode of the second switching transistor are connected to the GND pin by using the first resistor and are connected to the output end of the comparator circuit by using the second resistor,
a second electrode of the first switching transistor is connected to the CC pin of the type-A interface, and a third electrode of the first switching transistor is connected to the CC pin of the type-C interface,
a second electrode of the second switching transistor is connected to the output end of the voltage regulator circuit, and
a third electrode of the second switching transistor is connected to the CC pin of the type-C interface by using the sixth resistor,
wherein:

in a case that there is no signal on the CC pin of the type-A interface, the first switching transistor is in an off state, and the second switching transistor is in an on state; or
in a case that there is a signal on the CC pin of the type-A interface, the first switching transistor is in an on state, and the second switching transistor is in an off state.

6. The data cable according to claim 5, wherein the first switching transistor is an N-type Metal Oxide Semiconductor (NMOS) transistor, and the second switching transistor is a P-type Metal Oxide Semiconductor (PMOS) transistor.

7. The data cable according to claim 1, wherein the filtering circuit is an RC filtering circuit, and the filtering circuit comprises a third resistor and a capacitor,
wherein:
a first end of the third resistor is connected to the CC pin of the type-A interface,
a second end of the third resistor is connected to a first end of the capacitor,
a second end of the capacitor is connected to the GND pin, and
the first end of the capacitor is further connected to the second input end of the comparator circuit.

8. The data cable according to claim 7, wherein the comparator circuit comprises a fourth resistor, a fifth resistor, and a comparator,
wherein:
a first end of the comparator is connected to the control end of the switch circuit,
a second end of the comparator is connected to the output end of the voltage regulator circuit,
a third end of the comparator is connected to the output end of the filtering circuit,
a fourth end of the comparator is connected to the GND pin,
a fifth end of the comparator is connected to a first end of the fourth resistor and a first end of the fifth resistor,
a second end of the fourth resistor is connected to the GND pin, and
a second end of the fifth resistor is connected to the second end of the comparator, wherein
in a case that there is a signal on the CC pin of the type-A interface, the output end of the filtering circuit outputs a high-level signal, an electrical signal value on the third end of the comparator is greater than an electrical signal value on the fifth end of the comparator, the comparator outputs a first control signal, and the switch circuit connects the first end to the third end of the switch circuit in response to the first control signal; or
in a case that there is no signal on the CC pin of the type-A interface, the output end of the filtering circuit outputs a low-level signal, an electrical signal value on the third end of the comparator is less than or equal to an electrical signal value on the fifth end of the comparator, the comparator outputs a second control signal, and the switch circuit connects the first end to the second end of the switch circuit in response to the second control signal.

9. A charging device, comprising a data cable; and a charger,
wherein: the data cable comprises a type-A interface and a type-C interface,
wherein:

the type-A interface and the type-C interface are connected by using a cable, the type-A interface and the type-C interface each comprises a VBUS pin, a CC pin, a D+ pin, a D− pin, and a GND pin, wherein the VBUS pin, the D+ pin, the D− pin, and the GND pin of the type-A interface are connected to the VBUS pin, the D+ pin, the D− pin, and the GND pin of the type-C interface in one-to-one correspondence, and a circuit identification module is disposed in the data cable, wherein the circuit identification module comprises a switch circuit, a filtering circuit, a voltage regulator circuit, and a comparator circuit, wherein:
the switch circuit is connected to the CC pin of the type-C interface, an output end of the voltage regulator circuit, and the CC pin of the type-A interface, a control end of the switch circuit is connected to an output end of the comparator circuit, an input end of the voltage regulator circuit is connected to a VBUS cable in the cable, an output end of the voltage regulator circuit is further connected to a first input end of the comparator circuit, a second input end of the comparator circuit is connected to an output end of the filtering circuit, and an input end of the filtering circuit is connected to the CC pin of the type-A interface, wherein under the control of the comparator circuit, the switch circuit connects the CC pin of the type-A interface to the CC pin of the type-C interface, or connects the output end of the voltage regulator circuit to the CC pin of the type-C interface, the charger comprises a Power Delivery (PD) charging processing module, and when the charger is connected to the data cable, the PD charging processing module is connected to the CC pin in the type-A interface.

10. The charging device according to claim 9, wherein the voltage regulator circuit is a Low Dropout Regulator (LDO).

11. The charging device according to claim 10, wherein:
the circuit identification module further comprises a sixth resistor,
the sixth resistor is connected between the switch circuit and the CC pin of the type-C interface, and
the switch circuit is configured to connect the CC pin of the type-C interface to the output end of the voltage regulator circuit by using the sixth resistor, to connect the CC pin of the type-C interface to the CC pin of the type-A interface.

12. The charging device according to claim 9, wherein:
the circuit identification module is disposed in the cable, and
a distance between the circuit identification module and the type-A interface is less than a distance between the circuit identification module and the type-C interface.

13. The charging device according to claim 11, wherein the switch circuit comprises a first switching transistor, a second switching transistor, a first resistor, and a second resistor, wherein
a first electrode of the first switching transistor and a first electrode of the second switching transistor are control ends of the switch circuit, the first electrode of the first switching transistor and the first electrode of the second switching transistor are connected to the GND pin by using the first resistor and are connected to the output end of the comparator circuit by using the second resistor, a second electrode of the first switching transistor is connected to the CC pin of the type-A interface, and a third electrode of the first switching transistor is connected to the CC pin of the type-C interface, a second electrode of the second switching transistor is connected to the output end of the voltage regulator circuit, and a third electrode of the second switching transistor is connected to the CC pin of the type-C interface by using the sixth resistor, wherein:
in a case that there is no signal on the CC pin of the type-A interface, the first switching transistor is in an off state, and the second switching transistor is in an on state; or in a case that there is a signal on the CC pin of the type-A interface, the first switching transistor is in an on state, and the second switching transistor is in an off state.

14. The charging device according to claim 13, wherein the first switching transistor is an N-type Metal Oxide Semiconductor (NMOS) transistor, and the second switching transistor is a P-type Metal Oxide Semiconductor (PMOS) transistor.

15. The charging device according to claim 9, wherein the filtering circuit is an RC filtering circuit, and the filtering circuit comprises a third resistor and a capacitor, wherein:
a first end of the third resistor is connected to the CC pin of the type-A interface,
a second end of the third resistor is connected to a first end of the capacitor,
a second end of the capacitor is connected to the GND pin, and
the first end of the capacitor is further connected to the second input end of the comparator circuit.

16. The charging device according to claim 15, wherein the comparator circuit comprises a fourth resistor, a fifth resistor, and a comparator, wherein:
a first end of the comparator is connected to the control end of the switch circuit,
a second end of the comparator is connected to the output end of the voltage regulator circuit,
a third end of the comparator is connected to the output end of the filtering circuit,
a fourth end of the comparator is connected to the GND pin,
a fifth end of the comparator is connected to a first end of the fourth resistor and a first end of the fifth resistor,
a second end of the fourth resistor is connected to the GND pin, and
a second end of the fifth resistor is connected to the second end of the comparator, wherein
in a case that there is a signal on the CC pin of the type-A interface, the output end of the filtering circuit outputs a high-level signal, an electrical signal value on the third end of the comparator is greater than an electrical signal value on the fifth end of the comparator, the comparator outputs a first control signal, and the switch circuit connects the first end to the third end of the switch circuit in response to the first control signal; or in a case that there is no signal on the CC pin of the type-A interface, the output end of the filtering circuit outputs a low-level signal, an electrical signal value on the third end of the comparator is less than or equal to an electrical signal value on the fifth end of the comparator, the comparator outputs a second control signal, and the switch circuit connects the first end to the second end of the switch circuit in response to the second control signal.

* * * * *